United States Patent
Rangachar

Patent Number: 5,495,521
Date of Patent: Feb. 27, 1996

[54] METHOD AND MEANS FOR PREVENTING FRAUDULENT USE OF TELEPHONE NETWORK

[75] Inventor: Hemmige V. Rangachar, Millstone, N.J.

[73] Assignee: AT&T Corp., Murray Hill, N.J.

[21] Appl. No.: 152,993

[22] Filed: Nov. 12, 1993

[51] Int. Cl.$^6$ ............................ H04M 11/00; H04M 9/00
[52] U.S. Cl. ............................ 379/95; 379/145; 379/189; 379/198; 395/600; 364/DIG. 1; 364/282.1; 364/286.4; 364/286.5
[58] Field of Search ......................... 364/DIG. 1, DIG. 2; 395/600, 425; 379/95, 145, 189, 198

[56] References Cited

U.S. PATENT DOCUMENTS

| | | | |
|---|---|---|---|
| 4,447,676 | 5/1984 | Harris et al. | 179/90 |
| 4,531,023 | 7/1985 | Levine | 179/2 R |
| 4,679,226 | 7/1987 | Muehleisen | 379/95 |
| 4,683,583 | 7/1987 | Kossor | 379/200 |
| 4,719,566 | 1/1988 | Kelley | 364/200 |
| 4,761,808 | 8/1988 | Howard | 329/95 |
| 4,799,255 | 1/1989 | Billinger et al. | 379/189 |
| 4,809,323 | 2/1989 | Collins et al. | 379/399 |
| 4,831,648 | 5/1989 | Nishino | 379/95 |
| 4,905,281 | 2/1990 | Surjaatmadja et al. | 380/25 |
| 4,922,521 | 5/1990 | Krikke et al. | 379/95 |
| 4,953,202 | 8/1990 | Newell | 379/200 |
| 5,003,595 | 3/1991 | Collins et al. | 380/25 |
| 5,022,067 | 6/1991 | Hughes | 379/95 |
| 5,131,025 | 7/1992 | Hamasaki | 379/95 |
| 5,261,070 | 11/1993 | Ohta | 395/425 |
| 5,303,285 | 4/1994 | Kerihuel et al. | 379/58 |
| 5,351,287 | 9/1994 | Bhattacharyya et al. | 379/95 |
| 5,357,245 | 10/1994 | Hagiwara | 340/825.34 |

Primary Examiner—Thomas G. Black
Assistant Examiner—Jean R. Homere
Attorney, Agent, or Firm—E. Weiss; H. T. Brendzel

[57] ABSTRACT

Access of a user to a resource, such as a telecommunications network, includes storing, in a first call data base, a first set of attributes concerning an ongoing call from a caller. A second call data base stores a second set of attributes concerning the history of prior calls made by the caller. A rules data base stores rules concerning attributes for determining whether to disconnect the call, block future calls, or take other action. A determination is made whether data in at least one of the call data bases matches the rules in the rules data base. The call is then disconnected, the next call blocked, or other action is taken, in response to a match between data the call data bases and data in the rules data base. Preferably, the second call data base is updated in response to matches with the rules data base.

14 Claims, 11 Drawing Sheets

FIG. 3

| CHARACTERISTICS | ACTION PRIORITY | |
|---|---|---|
| NON. BUS. HRS.<br>LONG<br>INTERNATIONAL | L | 310 |
| NON. BUS. HRS.<br>LONG<br>DOMESTIC | L | 314 |
| NON. BUS. HRS.<br>LONG<br>DIALED NPA = 800 | L | 317 |
| NON. BUS. HRS.<br>LONG<br>DIALED NPA = 800<br>TERMINATION # = CPE<br>(ADD EXCLUSION) | L | 320 |
| NON. BUS. HRS.<br>LONG<br>DIALED NPA = 800<br>TERMINATION # = CPE<br>II DIGITS (COCOTS = 07) | M | 324 |
| NON. BUS. HRS.<br>LONG<br>INTERNATIONAL<br>BAD ANI<br>(GET THE LIST FROM CASE MGMT) | M | 327 |
| NON. BUS. HRS.<br>LONG<br>INTERNATIONAL<br>SUSP. ANI_NPA-NXX) | L | 330 |
| NON. BUS. HRS.<br>LONG<br>INTERNATIONAL<br>ANI = CPE<br>FORBIDDEN CC (CUST. DOESN'T ALLOW) | HHa | 334 |
| NON. BUS. HRS.<br>LONG<br>INTERNATIONAL<br>ANI = CPE<br>SUSP. CC (OR NOT CALLED BEFORE) | M, L | 337 |

FIG. 4

| CHARACTERISTICS | ACTION PRIORITY | |
|---|---|---|
| REG. BUS. HRS.<br>LONG<br>INTERNATIONAL<br>ANI = CPE<br>FORBIDDEN CC (CUST. DOESN'T ALLOW) | HHa | 410 |
| REG. BUS. HRS.<br>LONG<br>INTERNATIONAL<br>ANI = CPE<br>SUSP. CC (OR NOT CALLED BEFORE) | M, L | 414 |

FIG. 5

| CHARACTERISTICS | ACTION PRIORITY | |
|---|---|---|
| REG. BUS. HRS.<br>LONG<br>INTERNATIONAL<br>SDN-NRA<br>FORBIDDEN CC | HHa | 510 |
| REG. BUS. HRS.<br>LONG<br>INTERNATIONAL<br>SUSP. ANI-NPA-NXX<br>SDN-NRA<br>SUSP. CC | H | 514 |
| REG. BUS. HRS.<br>LONG<br>INTERNATIONAL<br>BAD ANI<br>SDN-NRA | M | 517 |
| REG. BUS. HRS.<br>LONG<br>INTERNATIONAL<br>BAD ANI<br>SDN-NRA<br>SUSP. CC | HH | 520 |
| NON. BUS. HRS.<br>LONG<br>SDN-NRA ACCESS<br>OFF-NET<br>DOMESTIC<br>SUSP. ANI-NPA-NXX | L | 524 |

FIG. 6

| CHARACTERISTICS | ACTION PRIORITY | |
|---|---|---|
| SINGLE CALL EVENTS WITH CELLULAR CALLS. | | |
| LONG<br>CELLULAR<br>INTERNATIONAL | L | — 610 |
| LONG<br>CELLULAR<br>TERM # = CPE | M | — 614 |
| LONG<br>CELLULAR<br>INTERNATIONAL<br>SDN | M | — 617 |

FIG. 7

| CHARACTERISTICS | ACTION PRIORITY | |
|---|---|---|
| SHORT<br>REPEAT ANI<br>NOT FREQUENT CALLER<br>DIALED NPA = 800<br>DIFFERENT DIALED # | L | — 710 |
| SHORT<br>NON. BUS. HRS.<br>REPEAT ANI<br>NOT FREQUENT CALLER<br>DIALED NPA = 800<br>DIFFERENT DIALED #<br>SUSP. ANI NPA-NXX | H | — 714 |
| SHORT<br>REPEAT ANI<br>NOT FREQUENT CALLER<br>DIALED NPA = 800<br>DIALED NXX-XXXX PATTERNED | H | — 717 |

FIG. 8

| CHARACTERISTICS | ACTION PRIORITY | |
|---|---|---|
| SHORT<br>NON. BUS. HRS.<br>REPEAT ANI<br>NOT FREQUENT CALLER<br>DIALED NPA = 800<br>DIALED # PATTERNED<br>SUSP. ANI NPA-NXX | HHb | 810 |
| SHORT<br>REPEAT ANI<br>NOT FREQUENT CALLER<br>DIALED NPA = 800<br>CONNECT TIME DIFFERENCE <= PDD + e<br>(THIS IS COMPUTER HACKING SCENARIO) | H | 814 |
| HACKING FOR AUTHORIZATION CODE (AC) | | 817 |
| SHORT<br>REPEAT ANI<br>NOT FREQUENT CALLER<br>REPEAT 800 DIALED NUMBER (ACCESS)<br>INVALID AC | H | 820 |
| SHORT<br>REPEAT ANI<br>NOT FREQUENT CALLER<br>REPEAT 800 DIALED NUMBER (ACCESS)<br>PATTERNED AC | HHb | 824 |
| ANI LOCKOUT FEATURE OF SDN<br>THIS IS A CURRENTLY OFFERED<br>SDN FRAUD PROTECTION FEATURE | | 827 |
| SHORT<br>REPEAT ANI<br>NOT FREQUENT CALLER<br>REPEAT 800 DIALED NUMBER (ACCESS)<br>INVALID AC<br>NUMBER OF CALLS IN REPEAT SET >= THRESHOLD | HHb | 830 |

FIG. 9

| CHARACTERISTICS | ACTION PRIORITY | |
|---|---|---|
| SIMULTANCITY OF CODES, MINS, ETC | | ← 910 |
| SDN<br>DIFFERENT ANI<br>SAME AC<br>> AT LEAST ONE CALL CONTINUING<br>> (THIS FOR IN PROG CALLS AS IN KBS NETWORK)<br>CALL DURATION OVERLAP<br>(THIS FOR NetEXPERT) | HHb | ← 914 |
| SDN<br>CELLULAR<br>SAME MIN<br>> AT LEAST ONE CALL CONTINUING<br>> (THIS FOR IN PROG CALLS AS IN KBS NETWORK)<br>CALL DURATION OVERLAP<br>(THIS FOR NetEXPERT) | HHb | ← 917 |
| GEOGRAPHIC REASONABLENESS | | ← 920 |
| CELLULAR<br>MULTIPLE CALLS<br>SAME MIN<br>(DIST. BETWEEN CALL ORIG. LOCATIONS)/(ELAPSED TIME)<br>>= THRESHOLD | HHb | ← 924 |

FIG. 10

| CHARACTERISTICS | ACTION PRIORITY | |
|---|---|---|
| LONG<br>BUSINESS HOURS<br>MULTIPLE CALLS (THRESHOLD TBD)<br>SINGLE ANI ORIGINATING<br>800 OR I/800 CALLS<br>SAME DIALED NUMBER<br>TERMINATING NUMBER NOT KNOWN TO BE DISA/RMATS | M | 1010 |
| LONG<br>BUSINESS HOURS<br>MULTIPLE CALLS (>= 5 PER HR. SUGG. THRESHOLD)<br>MULTIPLE ANI ORIGINATING<br>800 OR I/800 CALLS<br>SAME DIALED NUMBER<br>TERMINATING NUMBER NOT KNOWN TO BE DISA/RMATS | M | 1014 |
| LONG<br>BUSINESS HOURS<br>MULTIPLE CALLS (>= 5)<br>SINGLE ANI ORIGINATING OR MULT. ANI ORIGINATING<br>800 OR I/800 CALLS<br>SAME DIALED NUMBER<br>TERMINATING NUMBER KNOWN DISA/RMATS | H | 1017 |
| LONG<br>BUSINESS HOURS<br>MULTIPLE CALLS (>= 2)<br>SINGLE ANI ORIGINATING OR MULT. ANI ORIGINATING<br>800 OR I/800 CALLS<br>ORIGINATING IN SUSP. NPA-NXX OR PAYPHONE<br>(INDICATED BY ii DIGITS = 07)<br>SAME DIALED NUMBER<br>TERMINATING NUMBER KNOWN DISA/RMATS OR NOT KNOWN | H | 1020 |

FIG. 11

| CHARACTERISTICS | ACTION PRIORITY |
|---|---|
| LONG<br>BUSINESS HOURS<br>MULTIPLE CALLS FROM SAME ANI<br>KNOWN CPE OF CPE TYPE OF SERVICE<br>INT'L CALL<br>HIGH OR MEDIUM FRAUD COUNTRY<br>(THE THRESHOLD - NUMBER OF CALLS -<br>IS COUNTRY SPECIFIC) | H — 1110 |
| LONG<br>BUSINESS HOURS<br>MULTIPLE CALLS FROM SAME ANI<br>NON CPE TYPE OF SERVICE<br>INT'L CALL<br>HIGH OR MEDIUM FRAUD COUNTRY<br>(THE THRESHOLD IS COUNTRY SPECIFIC) | M — 1114 |
| LONG<br>OUT OF BUSINESS HOURS<br>MULTIPLE CALLS FROM SAME ANI<br>KNOWN CPE OR CPE TYPE OF SERVICE<br>INT'L CALL<br>HIGH OR MEDIUM FRAUD COUNTRY<br>(THRESHOLD IS COUNTRY SPECIFIC AND LOWER<br>THAN THE THRESHOLD FOR THE CORRESPONDING RULE<br>FOR BUSINESS HOURS CALLS) | H — 1117 |
| LONG<br>OUT OF BUSINESS HOURS<br>MULTIPLE CALLS FROM SAME ANI<br>NON CPE TYPE OF SERVICE<br>INT'L CALL<br>HIGH OR MEDIUM FRAUD COUNTRY<br>(THRESHOLD IS COUNTRY SPECIFIC AND LOWER<br>THAN THE THRESHOLD FOR THE CORRESPONDING RULE<br>FOR BUSINESS HOURS CALLS) | M — 1120 |

FIG. 12

| CHARACTERISTICS | ACTION PRIORITY | |
|---|---|---|
| LONG<br>BUSINESS HOURS OR OUT OF BUSINESS HOURS<br>MULTIPLE CALLS FROM SAME ANI<br>CPE TYPE OF SERVICE OR KNOWN CPE<br>DOMESTIC CALL<br>SUSPICIOUS TERM. NO (BULLETIN BOARD, ETC. FROM NEGATIVE DATABASE OF TERM. NUMBERS) | H | 1210 |
| LONG<br>BUSINESS HOURS OR OUT OF BUSINESS HOURS<br>MULTIPLE CALLS FROM SAME ANI<br>NON-CPE TYPE OF SERVICE<br>DOMESTIC CALL<br>SUSPICIOUS TERM. NO. (FROM NEGATIVE DATABASE OF TERMINATING NUMBERS) | L | 1214 |

FIG. 13

| CHARACTERISTICS | ACTION PRIORITY | |
|---|---|---|
| MULTIPLE CALLS (>= 5)<br>BILLED TO SAME NUMBER<br>INTERNATIONAL CALLS<br>HIGH OR MEDIUM FRAUD COUNTRY | H | 1310 |
| MULTIPLE COLLECT CALLS (>= 5)<br>TERMINATING AT SAME NUMBER<br>INTERNATIONAL CALLS<br>HIGH OR MEDIUM FRAUD COUNTRY | M | 1314 |
| MULTIPLE 1-800-ATT CALLS (>= 5)<br>FROM SAME ANI<br>INTERNATIONAL CALLS<br>HIGH OR MEDIUM FRAUD COUNTRY | H | 1317 |
| MULTIPLE CALLS (>= 5)<br>FROM SAME ANI<br>ANI IN SUSPICIOUS NPA-NXXX<br>BILL TO CARDS (SAME OR DIFFERENT) (0 + REPORT)<br>SAME TERMINATING NUMBER<br>TERMINATING NUMBER KNOWN DISA/RMATS | M | 1320 |

5,495,521

METHOD AND MEANS FOR PREVENTING FRAUDULENT USE OF TELEPHONE NETWORK

RELATED APPLICATIONS

This application is related to the applications of B. E. McNair, Ser. No. 07/891,347, filed May 29, 1992, and of A. Mukherjee, now U.S. Pat. No. 5,375,244, Ser. No. 08/134,358, filed Oct. 8, 1993, now pending, both assigned to the same assignee as the present application.

FIELD OF THE INVENTION

This invention relates to preventing fraudulent access to a resource, and particularly to methods and means for blocking or disconnecting telephone calls, in real time, from callers that are attempting to gain fraudulent access to telephone networks.

BACKGROUND OF THE INVENTION

Fraudulent telephone calls are a major source of revenue loss to telephone service providers. They also result in customer dissatisfaction when tolls are inadvertently charged to the subscriber as a result of fraudulently placed calls. Present systems use batch mode analysis of call details and sometimes manage to detect some types of fraud. This arrangement requires the telephone company to communicate with the culprit to end the abuse. It entails a delay in the prevention of fraud.

The aforementioned U.S. Application, Ser. No. 07/891,347 filed May 29, 1992, now U.S. Pat. No. 5,375,244 discloses an access control system which uses "soft" decisions to determine if a user's profile are most like a valid user or a hacker. It clusters data for both and compares the user with both to obtain statistical probabilities of fraudulent access.

An object of the invention is to overcome the disadvantages of prior systems.

Another object of the invention is to detect and block or disconnect fraudulent access demands in real time.

SUMMARY OF THE INVENTION

According to a feature of the invention, these objects are attained by storing, in a control data base, a set of attributes concerning an access from an access demand source; maintaining a rules data base of rules concerning attributes for determining corrective action; determining whether data in the control data base matches the rules in the rules data base; and effecting corrective action by disconnecting the access during access time in response to a match between data in the control data base and data in the rules data base.

According to another feature of the invention, storing in the control data base includes storing in a first access data base a first set of attributes concerning the ongoing access.

According to another feature of the invention, storing in the control data base includes storing in a second access data base a second set of attributes concerning the history of prior accesses made by the access demand source; the step of determining whether data in the access data base matches the rules in the rules data base includes determining whether to disconnect the access, block future accesses, or take other action; and the step of effecting corrective action includes disconnecting the access, blocking future accesses, or taking other action.

According to another feature of the invention, the second access data base is updated on the basis of the matches.

These and other features of the invention are pointed out in the claims. Other objects and advantages of the invention will be evident from the following detailed description when read in light of the accompanying drawings.

BRIEF DESCRIPTION OF THE DRAWINGS

FIGS. 3 and 4 show the rules for operation of the network and system in FIGS. 1 and 2 for CPE fraud according to an aspect of the invention.

FIGS. 5 and 6 show the rules for operation of the network and control system in FIGS, 1 and 2 for CPE fraud according to an aspect of the invention.

FIGS. 7 and 8 show the rules for fraud involving hacking to remote access ports of CPE (Customer Premises Equipment) and SDN-NRA (Software Defined Network—Network Remote Access) according to an aspect of the invention, FIG. 9 shows the rules to detect fraud involving multiple calls with the same SDN code or cellular MIN, and successive cellular calls with far apart originating locations from the same caller according to an aspect of the invention.

FIGS. 10 to 12 shows the rules for multiple calls likely to be actual fraud calls through the CPE according to an aspect of the invention.

FIG. 13 shows rules for detecting various kinds of miscellaneous fraud according to an aspect of the invention.

DETAILED DESCRIPTION OF PREFERRED EMBODIMENTS

Figure 1:
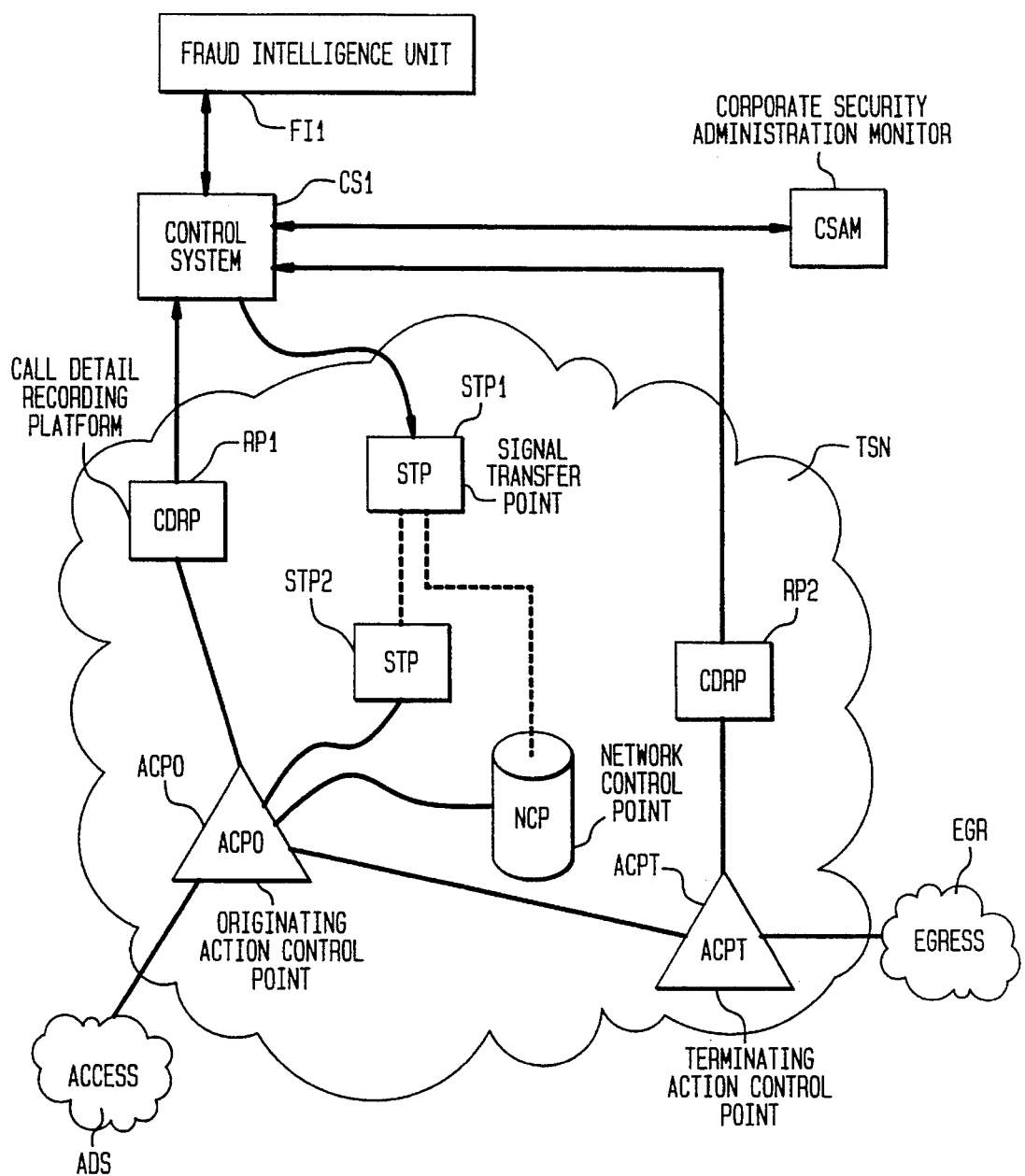
FIG. 1 illustrates a telephone network embodying features of the invention.

FIG. 1 illustrates an arrangement embodying features of the invention. Here, a telephone switch network TSN connects a caller, or access demand source, ADS to a called party or egress EGR through two switches or central offices, namely, an originating action control point ACPO and a terminating action control point ACPT. The originating action control point ACPO and the termination action control point ACPT communicate with call detail recording platforms (CDRPs) RP1 and RP2 to supply the latter continuously with call detail records on a real-time basis. The action control points ACPO and ACPT generate these records for billing and record keeping by the CDRPs.

The CDRPs RP1 and RP2 also communicates with a control system CS1 which taps into the event message stream in the CDRPs RP1 and RP2 on a real-time on-demand basis. This means that the data is available to the control system CS1 while the call is going on. The control system CS1 analyzes the information elements which are contained in the CDRPs RP1 and RP2, as part of the detection of fraud events. In one embodiment of the invention, the control system CS1 accesses the data on all calls in the CDRPs RP1 and RP2. According to a preferred embodiment the control system CS1 accesses, from the CDRPs RP1 and RP2 only data for particular types of calls likely to produce significant fraud costs, namely:

Calls which are very short duration (<10 sec) These are interesting because these may be generated by automatic hacking devices.

Calls which are very long duration (>20 min).

International calls.

Calls placed on business customer's equipments and on business communication services. (Fraud call charges are billed mostly to business customers.)

Limiting the access to calls of this sort, eliminates the bulk of telephone calls from scrutiny by the control system CS1. These eliminated calls are normal calls which have a very low probability of incidence of fraud. When such incidences do occur, the loss to the network is small because they tend to be short distance domestic calls of short duration. This prefiltering, selects only calls which have an economically significant fraud cost to the network for transmission from the CDRPs RP1 and RP2 to the control system CS1.

According to one embodiment of the invention, the CDRPs RP1 and RP2 perform the selection, i.e. prefiltering, and according to another embodiment, the control system CS1 performs the prefiltering. In the latter embodiment, the CDRPs RP1 and RP2 accumulate the prefiltered records of all the calls which are being originating and progressing through all the toll switches of the area served by it for a small and convenient interval, say 15 seconds and sends the set to the control system CS1. The data on the prefiltered calls sent to the control system CS1 are herein called X-records.

The control system CS1 also exchanges data with a fraud intelligence unit (FIU) FI1, a telephone company corporate security administration monitor (CSAM) CSA1, and other control systems. The fraud intelligence unit FI1 has a database which stores "historic" information which is used for reference, to decide whether an information element on a record is significant for fraud detection or not.

According to an embodiment of the invention, the database of the fraud intelligence unit FI1 stores the following information:

PBX ANIs (Private Branch Exchange Automatic Number Identifications).

University PBX's and Centrex's.

Suspicious NPAs-NXX for originating numbers.

Suspicious Terminating Numbers.

Suspicious Country codes.

Forbidden country codes.

Compromised Authorization Codes.

ANI's from detected fraud events.

Originating numbers from detected fraud events.

Terminating numbers from detected fraud events.

Authorization codes from detected fraud events.

Other optional files entered manually by CSAM CSA1

In other embodiments, the FIU FI1 contains other information.

Figure 2:
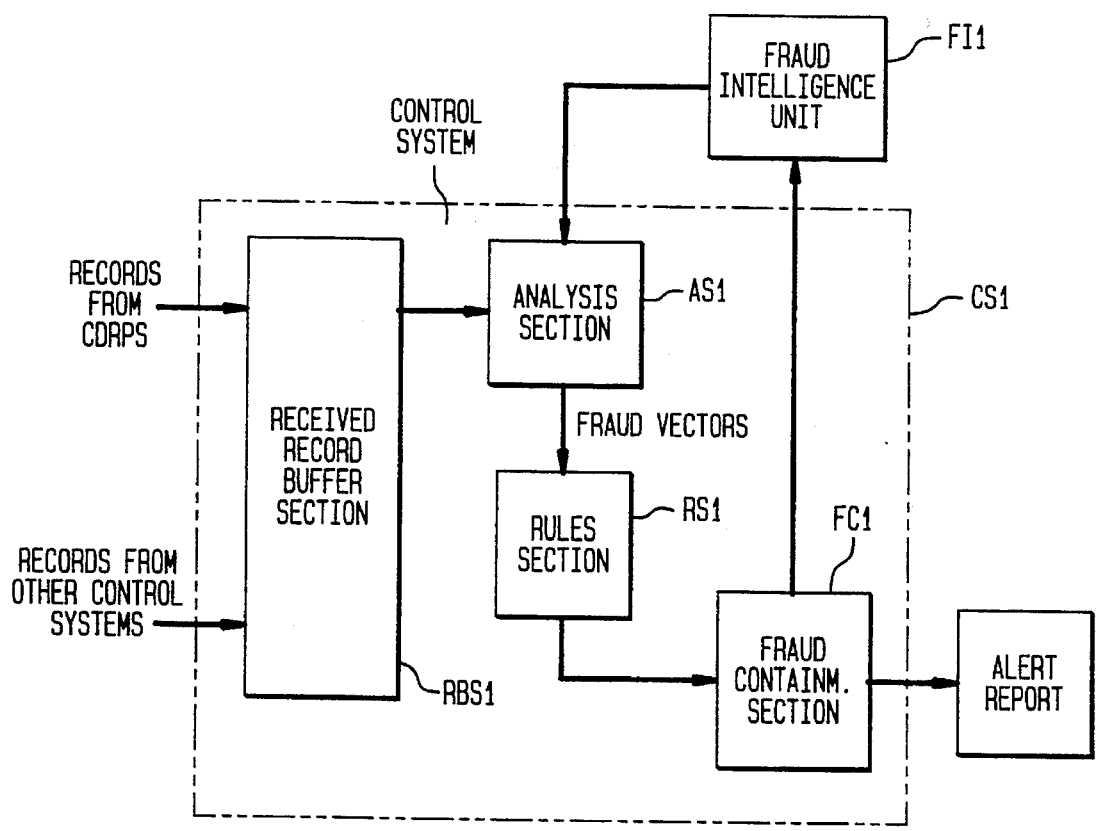
FIG. 2 block diagram of a control system in the network of FIG. 1 according to an aspect of the invention.

FIG. 2 is a block diagram of the control system CS1 in FIG. 1. The control system CS1 is preferably in the form of a single processor which performs its various functions. FIG. 2 shows the control system as composed of individual sections, namely a received record buffer section RBS1, an analysis section AS1, a rules section RS1, and a fraud containment section FC1. However, each of the blocks preferably represents a function of the processor, rather than an individual unit, and the processor may perform all the functions with the same hardware. Nevertheless, according to an embodiment of the invention, any or all the blocks may be a separate section or unit. The blocks in the control system CS1 are referred to as sections for convenience.

The control system CS1 accesses the data from the CDRPs RP1 and RP2 and the fraud intelligence unit FI1 and matches the accessed data with a set of rules which the control system stores. The rules appear in FIGS. 3 to 13 and define the existence of various levels of fraud events such as HHa, HHb, H, M, and L. If the data matches a high level HHa, the control system CS1 signals the signal transfer point STP1 to disconnect the ongoing call. If the level is HHb, it signals the signal transfer point STP1 to block the next call from the access source ADS.

The control system CS1 also transfers information about detected fraud events to the CSAM CSA1 to raise alarm signals so that the network personnel can take appropriate manual control. Such manual operation may override the control system CS1 and disconnect selected calls or block selected calls, or to inhibit the disconnect of blocking action of the control system CS1. The CSAM CSA1 can also enter new information into the fraud intelligence unit FI1 database.

In FIG. 2, the control system CS1 receives the set of records from the CDRPs RP1 and RP2 and enters it to the received records buffer section RBS1. The analysis section AS1 receives the data from the buffer section RBS1 and uses the data from the fraud intelligence unit FI1 to derive vectors each of which conforms to a data element or characteristic in the rules in FIGS. 3 to 13. In other words, in order to match the data to the rules, the data must be in the format of each of the elements or characteristics of the rules. Accordingly, the analysis section AS1 vectors which specify whether a call is:

During business hours.

During non-business hours.

Excessively long.

Domestic calls.

To a limited dialed NPA=800.

To a termination number=CPE.

To a country code.

ANI=CPE (Automatic Number Identification with Customer Premises Equipment).

Using SDN-NRA (Software Defined Network

Network Remote Access).

To a suspected country code.

Using a bad ANI.

Of short duration.

Using repeated ANI.

From non-frequent caller.

To successive different dialed numbers.

Using suspected patterned dialing.

With a connect time difference using a less than PDD (Post Dialing Delay) +e, i.e. going from one to another number quickly.

Using an invalid authorization code.

With a number of calls in repeat set greater than threshold.

Using a SDN Software defined network (virtual private network).

Using different ANI to same termination No.

Using the same authorization code from another location greater than at least one call continuing.

Having greater than call duration overlap.

With simultaneous use of mobile number.

Cellular.

Of the same MIN (Mobile Identification Unit).

Using distance between call locations/elapsed time greater than a given value τ.

Multiple calls from same ANI (Automatic Number Identification) greater than x.

Repeated dialed numbers.

Terminating at a number which is a known DISA/RMATS (Direct Inward Switched Access/Remote Maintained Access Test System Maintained Port).

Originating in suspect NPA-NXX or pay phone.

Multiple calls from same ANI.

CPE (Customer Premise Equipment) to a Known high fraud country.

CPE (Customer Premise Equipment) to known medium fraud country.

Non CPE type of service.

Suspicious terminating number.

Multiple calls billed to same number.

Multiple 800 calls exceeding preset number.

It will be understood that other vectors may be derived, and that the above list is by no means inclusive of all vectors possible. Other embodiments do not use all the aforementioned vectors.

Some of these vectors deal with quantitative values such as whether a call is short or long. The analysis section AS1, in deriving the vectors, compares each quantitative value with a threshold to produce a vector that indicates a high or low quantity such as a long call or short call. The thresholds may be varied manually or automatically with the time of day, time of the month, or other circumstances, to change the criticality of the data.

The rules section RS1 stores the rules in FIG. 3 to 13 in the form of a look-up table. Each horizontal box in FIGS. 3 to 13 is a rule. In each box, the left side lists elements corresponding to vectors and the right side of each box indicates the action priority associated with the elements in the left side. The section RS1 of the processor scans the set of characteristics or vectors of a particular call and compares all the vectors with each of the rules in the boxes in FIGS. 3 to 13. It determines if the vectors of a call matches a rule.

In FIGS. 3 to 13, each rule is associated with a letter designation representing an action priority, such as HHa, HHb, H, M, and L. Action priorities are L for low, M for medium, H for high, HHa and HHb for very high. These designations represent the action categories which the control system CS1 would execute, if the rule became "true". They depend upon the seriousness and the certainty of detection.

If any set of the vectors matches all the elements in a rule, the rules section RS1 designates the particular action priority indicated in the rule. Various different calls may have vectors which satisfy several rules.

HHa and HHb are the categories that represents the highest priority of the action categories. In this case, it is considered that the detected event is certain to be fraudulent and automatic action to prevent the incident is taken by the control system. If the fraud event is that of a hacker's attempt to break into the toll network, then the preventive action is to block his next attempt by diverting it to a ring busy terminal. This action is signified by the action priority being HHb. If the action priority is HHa, then the solution is to disconnect the call which is in progress.

The fraud containment section FC1 responds to the rules section RS1 and sends out an alert report to the CSAM CSA1 and the FIU FI1 with respect to all the action priorities. If the action priority is HHb, it instructs the signal transfer points STP1 and STP2 to hold that information in a network control point NCP which handles the call processing of service calls. The latter then blocks succeeding calls from the same caller for a specific time. It does this by diverting the call to a ring busy terminal.

If the action priority is HHa the fraud containment section FC1 instructs the signal transfer point STP1 and STP2 to make the originating action control point ACPO or the terminating action control point ACPT disconnect or otherwise disable the call. This causes the switch to disconnect the call. Thus the fraud caller will experience a hang-up in the middle of a call. If successive calls within a predetermined time period arrive from that telephone, that call will be treated by blocking as for action priority HHb.

An action priority H carries the detection of a fraud event which is of slightly lower certainty but nevertheless, needs immediate attention. The fraud control section FC1, in this case, calls for a human decision to execute prevention action. Such action is initiated from the corporate security administration monitor CSAM by sending special command which may result in the same actions as described above.

An action priority M indicates a further grade of less certainty of detection and the action treatments similar to that of H except that the human decision to take preventive action can be more deliberate and calculated to take many other aspects of the case, deriving from intelligence which are not available to the machine.

Action priority L is the lowest category. Preventive action is again human initiated, but is expected to be very infrequent for this category.

For all these categories, the fraud control section FC1 enters the following information from the call record to the fraud intelligence database.

Originating number

Dialed number

Terminating number

Authorization Code used

Action priority

The fraud intelligence database FI1 stores this information for future calls. It bestows a capability of learning from experience to an otherwise mechanical rule-based system. The CSAM CS1 can constantly edit and monitor the intelligence thus collected via human supervision to prevent the detection process being corrupted by the uncontrolled growth of obsolete information.

The rules in FIGS. 3 and 4, boxes 310 to 414 deal with CPE fraud. Here, boxes 334 and 410 result in HHa action priorities.

The rules in FIGS. 5 and 6, boxes 510 to 524 and 610 to 617 deal with the possibility of cellular fraud or SDN-NRA (Software Defined Network—Network Remote Access) fraud. Here, for example, in the matches of 520, a long SDN-NRA international call during regular business hours using a bad ANI and suspected country code results in an HH (higher H) action priority. Matches at boxes 510 and 514 result in high action priorities whereas matches at boxes 517, 524, 610, 614, and 617 produce low or medium action priorities.

FIGS. 7 to 13 deal mainly with multiple call events. These fraud scenarios require the characteristics contained in a number of records of the recent past. In one embodiment of the invention, the rules in these figures are implemented with individual thresholds for each rule. FIGS. 7 and 8 deal specifically with fraud involving hacking to remote access ports of CPE (Customer Premises Equipment) and SDN-NRA (Software Defined Network—Network Remote Access). The rules in FIG. 9 detect fraud situations involving multiple calls where the same SDN authorization code or cellular MIN may be used, as well as successive cellular calls where the originating locations are too far apart to be originated by the same caller.

FIGS. 10 to 12 shows the rules that apply to multiple calls when the calls are likely to be actual fraud calls through the CPE (Customer Premises Equipment). FIGS. 11 and 12 show the rules for detecting the outgoing leg of actual fraud calls being perpetrated, possibly by call sellers.

FIG. 13 shows rules for detecting various kinds of miscellaneous fraud, e.g. third party fraud, collect call fraud, and card fraud to bypass 800 numbers blocks from pay phones.

As is evident, boxes 334, 410, and 510 ordain action priority HHa which result, according to an embodiment of the invention, in fraud containment section FC1 signalling to disconnect the ongoing call and, according to an embodiment, to block the next immediate call if it comes from the same caller. Boxes 810, 824, 830, 914, 917, and 924 cause the rules section RS1 via fraud containment section FC1 to signal blocking of succeeding calls which come from the same caller and have characteristics having action priority HHb.

Figure 14:
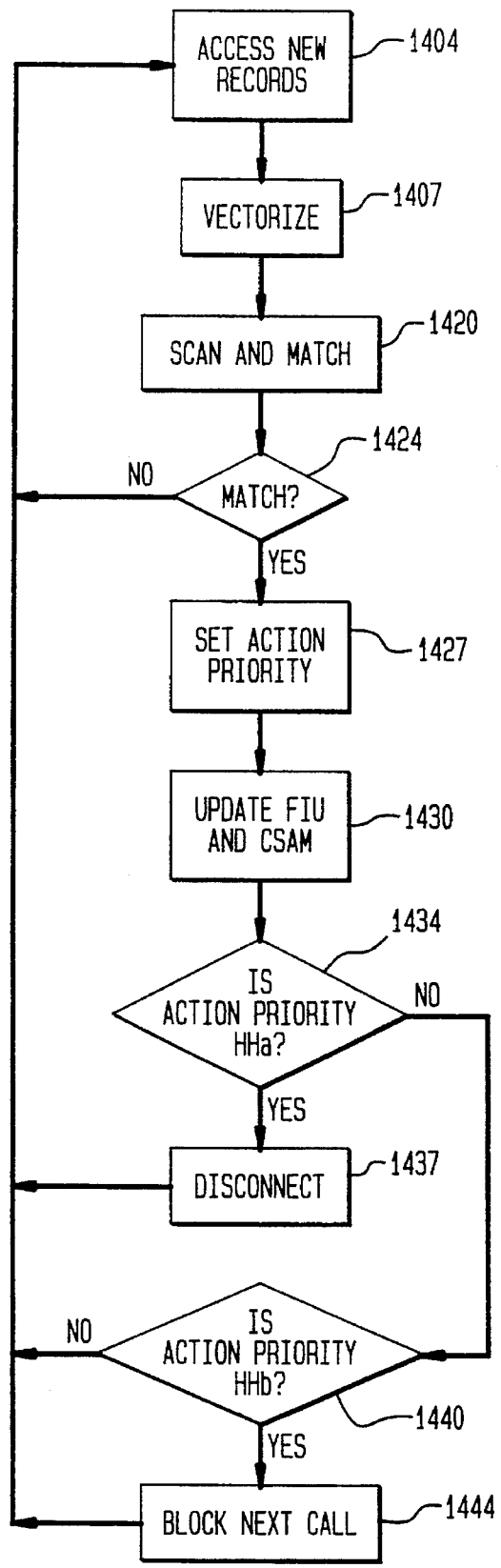
FIG. 14 is a flow chart illustrating operation of the system in FIGS. 1 and 2.

FIG. 14 is a flow chart showing operation of the control system CS1 in FIGS. 1 and 2. In FIG. 14, step 1404, the control circuit CS1 accesses new records from the CDRPs RP1 and RP2 and from the fraud intelligence unit FI1. The received-record buffer section RBS1 in the control system CS1 accesses and stores prefiltered records from the CDRPs RP1 and RP2 and other control systems CS1 at other locations and removes the oldest data if the buffer is full. The analysis section stores the data from the fraud intelligence unit FI1.

In step 1407, the analysis section AS1 in the control system CS1 accesses the next sequential record from the buffer section RBS1 and vectorizes the data in the record by using the data from the fraud intelligence unit FI1. For example, vectorizing involves taking an ANI and querying the FIU FI1 if it is a bad ANI. If so, the analysis section AS1 defines it as "Using a bad ANI" and thereby places it in a format that conforms to the format of a data element or characteristic in the rules section RS1 so that the record can be matched with the record in the rules of FIGS. 3 to 13. It includes applying appropriate thresholds, and referring to the records to the FIU database when needed.

In step 1420, the rules section RS1 receives the data from the analysis section AS1 and scans the vectors and compares them with the next (or the first, if this is the first) rules to see if they match the rules.

In step 1424, the rules section RS1 asks and acts if any of the combinations of vectors in this call match a rule, i.e. match all the data elements or characteristics of a rule. If yes, the rules section RS1 goes to step 1427 and directs an action priority dictated by the rule to the fraud containment section FC1. If not, it returns to step 1407 and accesses the next record.

Upon receiving the action priority, the fraud containment FC1 issues an alert report to the CSAM CS1. In step 1430, it adds the action priority and call data to the database of the fraud intelligence unit FI1 and the CSAM.

In step 1434, the fraud containment section FC1 determines if the action priority is HHa. If yes, the fraud containment section FC1 proceeds to step 1437 and sends a signal to disconnect the caller and, in an embodiment, to blocks the next immediate call from that caller. It also returns the process to step 1404. If the answer in step 1434 is no, in step 1440, the fraud containment section FC1 asks if this is of action priority HHb. If yes, in step 1444, fraud containment section FC1 sends a signal to block the next call and return the operation to step 1404. If no, it returns the operation to step 1407.

While the various steps in FIG. 14 were ascribed to various sections RBS1, AS1, RS1, and FC1 of the control system CS1, these can be performed by any form of processor arrangement in the system SC1. The invention is not limited to this section arrangement nor this series of steps. The system CS1 may perform its function of combining the data and comparing it to the rules stored therein to obtain an action priority in any number of other ways.

While only two action control points and CDRPs appear in the drawings, it will be evident that other action control points may be part of the network, and each has a CDRP which communicates with the control system CS1.

According to an embodiment of the invention, the rules section RS1 of the control system CS1 distinguishes between calls that it can identify as possibly fraudulent from a single call, such as shown in boxes 334 and 410, and identifications that require a number of calls, such as hacking. The former are called single call events and the latter multiple calls events. The rules section RS1 then first attempts to match only vectors using data from the CDRPs with boxes having single call events. Thereafter, it scans and matches vectors with the data from both the CDRPs and the fraud intelligence unit FI1 with the remaining boxes.

In an embodiment, a different version of the rules in FIG. 10 is obtained by considering out of business hour calls. In those rules, if the calls come in from suspicious NPA-NXX, or pay phones (indicated by ii digits), the threshold will be lower (single call) for action priority H. Otherwise the action priority is at least as high as that for rules applying to business hour calls.

It will be noted that the control system CS1 is connected to the fraud intelligence unit FI1 for querying the unit's database for information which is required during the fraud detection process. This connection is also used by the control system CS1 to enter and delete information in the database of the fraud intelligence unit FI1, when fraud information which is obtained from detected events is saved for future use.

According to an embodiment the fraud events which are to be detected are expressed in the form of Boolean rules. These rules are logical expressions each of which describes a particular fraud scenario. These rules describe certain basic characteristics of a fraud event or fraud vectors. The rules are executed logically in the control system processor, and if the outcome of a rule is "true", then a corresponding fraud event has been detected. If false, there is no fraud event detected by that rule and the processor moves on to apply the next rule. This process runs continuously, to apply all the rules in the repertoire of the control system, for every new X-record which is pumped into the RBS1 from the CDRPs RP1 and RP2.

According to an embodiment, in the received record buffer section RBS1, the records are arranged in a chronological scheme, the latest set being on the top and the oldest set being dropped from the buffer at the bottom. The received record buffer section RBS1 holds about 4 hours worth of prefiltered records (X-records) and this serves as a form of short term historical data store.

In an embodiment of FIG. 2, the analysis section AS1 uses the database of the fraud intelligence unit FI1 in the analysis process. It first examines an X-record from the received record buffer section RBS1 information element by information element, and determines its characteristics of fraud.

The X-records contain in general, a mix of quantitative and qualitative information. In an embodiment, the latter are also expressed in the form of binary coded decimal digits, which encode the qualities. But, the fraud scenario rules are in terms of vectors. Thus, the analysis section AS1 converts the quantitative and encoded qualitative information of the X-record into corresponding vectors.

In this embodiment, the method is based on two separate procedures. In the simplest of cases, a quantitative value is compared against some threshold values (which are conveniently arranged to be adjustable), in a simple equation or inequality expression. For example, consider the information element called "call duration" which is expressed in the record in terms of seconds. This needs to be vectorized to just two vectors, short and long. It is done in the following expression, which is executed during the analysis procedure.

If call duration <=t1 then short.

If call duration >=t2 then long.

The thresholds t1 and t2 are adjustable, which makes the definition of short and long relative.

In an embodiment, the analysis section AS1 reduces the information elements of an X-record to vectors in this rule based manner. For some others, especially the telephone numbers, the analysis section AS1 refers to the fraud intelligence unit FI1 database in order to derive its vectors. For example, the analysis section may consider a typical originating number on an X-record. To determine if this is a PBX number, it queries the FIU if this is on the list of suspected ANI's. It also determines if the originating number on the X-record is from a suspicious calling area from where a large number of fraud calls are made by referring to the FIU FI1. The analysis unit AS1 obtains such information by a query to the fraud intelligence unit FI1 database. The information is found there, because it was entered there previously.

Further, it determines if the originating number is a repeating originating number of many calls which have been made within the last 4 hours by searching through the record of the buffer section RBS1. It determines if this is "Using repeated ANI". The analysis unit AS1 derives this vector by matching the same originating number in many of the records which are in the RBS1. If the number of occurrences exceed a threshold N1 it is significantly repeating. This search and match operation is carried out to obtain vectors which are needed before the rules for multiple call fraud events are applied.

Thus, in this embodiment, by repeated application of these steps to the information elements of the X-record, the analysis unit AS1 converts the records to vectors. In addition to the vectors, the analysis unit AS1 retains some of the information elements from the original X-record as they are. These are:

Record ID

Call ID

Toll Switch ID

Originating number

Dialed number

Terminating number

Authorization code.

These numbers are used in post detection actions of prevention, and record keeping procedures. These are retained in addition to their vector forms. All others are used in their vector form only.

As stated, the rules section RS1 classifies fraud events into two classes called a single call event and a multiple call event. The single call event requires the analysis of the information elements in the record of a single call only. For example, a record may bear the following information:

International call

Call made from a PBX

Long duration call

Off-business hour call

Terminating in a high fraud country.

This scenario does not need the information contained in any other records to declare that this record represents a fraud event. FIGS. 3 to 6 describe many scenarios of single call fraud events which the rules section RS1 includes in its repertoire.

Multiple call fraud events require the information carried on more than one record. The rule which describes such an event in the rules section RS1 will contain vectors which refer to characteristics which can only be derived from analyzing and comparing several records.

The rules section RS1 derives these characteristics by the analysis and comparison of many records. FIGS. 7 to 12 contain examples of fraud scenarios of this class. In general, this class represents the more difficult to detect fraud events. A 4 hour storage requirement of the RBS1 is used for the detection of this class of events. This chronological store of records allows the rules section RS1 to perform the required comparison among the collected records to detect such events. However, records of time durations, such as 2 to 8 hours, may also be used.

The rules depicted in the FIG. 13 cover a large number of rules of both these classes and enable the detection system to be capable of detecting most of the commonly committed fraud acts. In the figure, the vectors of the rules are represented as a list implying that they all must be present concurrently to make the rule "true". In other words, the "AND" designation of the boolean expression has been dropped. Additions and deletions to the rules may be made with ease to give high flexibility to the process.

To disconnect a call, the fraud containment section FC1 responds to the action priority from the rules section RS1 and sends a message to the signal transfer points STP1 and STP2. The section FC1 gives the identity of the switch and the call which originated there, along with a command which makes the switch operate as if the call has been terminated by the called party. This causes the switch to disconnect the call and go through all the normal procedures which accompany the termination of a call. Thus the fraud caller will experience a hang-up in the middle of a call. If a second call from that telephone is initiated, that call will be treated by blocking as for the case HHb.

In the switch network TSN, signal transfer points STP respond to the fraud control section to operate on originating and terminating action control points ACPO and ACPT which disconnect calls coming from an access demand source ADS and going to an egress EGR. In the switch network TSN, signal transfer points STP coact with network control points NCP to operate on originating and terminating action control points ACPO and ACPT which block calls coming from an access demand source ADS and going to an egress EGR. Call data may pass directly between the originating access control points ACPO and ACPT and the fraud intelligence unit FI1.

The basic nature of the detection process which is employed is that of an expert system which employs recognition of the various elemental characteristics of the phenomenon which is to be detected. It is rule-based and heuristic in nature, as opposed to mathematical methods based on statistical parameters and multidimensional representations. The heuristic method of the invention, is very flexible, adaptable, and is not based on statistical studies of the fraud events. Natural neural systems, which are the result of millions of years evolution, are based on similar heuristic strategies, in which the incoming information is filtered to obtain a finite set of characteristics and building up more complex composites from them, which act as templates for matching and final detection.

Short calls cannot be detected until after termination. The CDRPs transmit short calls to the control system CS1 immediately after termination.

In an embodiment, the fraud intelligence unit includes a processor that organizes the database to deal with query and response from the control system CS1.

The information to the FIU FI1 is initially entered manually on the basis of prior fraud cases. To provide the fraud intelligence unit FU1 with further initial information, the control system CS1 is then set in a "training mode" before it is fully deployed. In this mode, the control system is inhibited from executing any preventive actions, but freely detects fraud events. In this mode, it adds to the initial human input by pumping important intelligence data to the database of the fraud intelligence unit FI1. This data can be carefully monitored and used for detection, when fully deployed. When fully deployed, the control system CS1 updates the database of the fraud intelligence unit FI1 with information on new fraud events.

To increase the flexibility of the detection process, any information which is considered as contributing to increase the certainty of detection can be stored in the fraud intelligence unit FI1 database and referred to at the time of analysis. No restrictions based on mathematical consistency need apply.

The Control System CS1 can be located centrally or in a distributed manner as one per switch office, according to the economics and performance requirements of the telephone switching network TSN. In either case, it is situated conveniently to collect call detail records from all the toll switches of the telephone switching network TSN.

In the embodiment of FIG. 1, the call detail records are arranged to be collected from the switches ACPO and ACPT via their CDRPs RP1 and RP2 and RP2. The records are collected in real time, which means that the data about a call are available at the control system CS1 while the call is still in progress. Continuous elapsed time data is made available for calls which are in progress. In the case of very short calls the data on the calls are collected immediately thereafter.

From a very high level point of view, the main functions of the control system CS1 are to:

(1) detect fraud events by analyzing call records, (2) execute actions as indicated by action priorities, and (3) communicate as needed with the CDRPs, the database of the fraud intelligence unit FI1, and the corporate security administration monitor CSAM.

The real-time operating system of the control system CS1 performs the first two functions in a cyclic fashion and the third one on a on-demand or needed basis. The detection, the execution of actions, and the presentation of information to the corporate security administration monitor CSAM takes place in a cyclic fashion, whereas the CDRPs RP1 and RP2 and RP2 and the corporate security administration monitor CSAM are serviced as they interrupt the control system CS1 with a demand for service. The control system CS1 will query the database of the fraud intelligence unit FI1, as required in the analysis of the call detail information contained in the call records, during the detection process.

In FIGS. 3 to 13, the rules are arranged in a pyramidal fashion, moving from a very general scenario to more and more defined and restrictive scenarios. The more restricted the scenario is, the higher is the detection certainty that the event is fraudulent.

In an embodiment, to block a call, the fraud containment section FC1 responds to the action priority from the rules section RS1 and sends a special message to the signal transfer point STP1. The message contains a command to block the next call from a specified ANI. The STP signal transfer point STP1 will distribute this command to the correct Network Control Point NCP, which handles the call processing of all business service calls. The network control point NCP will then, divert the call to a ring busy terminal, which will frustrate the caller's attempt to use the network.

In step 1437, the fraud containment section FC1 acts to disconnect the caller and block the next call from the caller. According to an embodiment of the invention, the next call is not blocked.

According to an embodiment of the invention, the FIU FI1 contains a processor which performs the matching functions with data from the analysis section AS1.

While embodiments of the invention have been described in detail, it will be evident to those skilled in the art that the invention may be embodied otherwise without departing from its spirit and scope.

What is claimed is:

1. A method of controlling access of a user to a telephone network, comprising the steps of:

storing, in a control data base, a set of attributes concerning an ongoing incoming call from an access demand source by a user;

maintaining a rules data base of a plurality of rules designating one of a plurality of degrees of likelihood that any call having a particular attribute is fraudulent, some of said degrees being high and some being lower;

determining whether an attribute in the data of the control data base matches an attribute in one of the plurality of rules in the rules data base; and effecting corrective action in response to a match between data in the control data base and predetermined rules in the rules data base on the basis of the degree of likelihood indicated by the matching in the rules data base that the call is fraudulent;

the step of storing in the control data base including storing in a first access data base a first set of attributes concerning the ongoing incoming call;

the step of storing in the control data base including storing in a second access data base a second set of attributes concerning the history of prior accesses made by the access demand source;

the step of determining whether data in the one of the access data bases matches the rules in the rules data base including determining whether to disconnect the incoming call, block future incoming calls, or take other action; and the step of effecting corrective action including disconnecting the incoming call, blocking future incoming calls, or taking other action;

the step of storing in the second access data base including updating the second access data base with data from incoming calls having matches in the determining step.

2. A method as in claim 1, wherein the step of effecting corrective action includes ignoring matches of attributes in the control data base and the rules data base when the attribute in the rules data base indicates a lower degree of likelihood that the call may be fraudulent.

3. A method as in claim 2, wherein said step of storing in said first access data base includes storing one or more of the following attributes:
   requesting user;
   request time;
   length of use;
   destination requested;
   user authorization code;
   whether use request is cellular.

4. A method as in claim 1, wherein said step of storing data in said second access data base includes storing one of the following:
   PBX ANIs (Private Branch Exchange Automatic Number Identifications);
   University PBX's and Centrex's;
   Suspicious NPAs-NXX (pay phones indicated by ii digits) for originating numbers;
   Suspicious Terminating Numbers;
   Known bad ANIs;
   Suspicious Country codes;
   Forbidden country codes;
   Compromised Authorization Codes;
   ANI's from detected fraud events;
   Originating numbers from detected fraud events;
   Terminating numbers from detected fraud events;
   Authorization codes from detected fraud events;
   Other files as required by CSAM (Telephone Corporation Security Administration Monitor).

5. A method as in claim 4, wherein said step of storing in said first access data base includes storing one or more of the following attributes:
   requesting user;
   request time;
   length of use;
   destination requested;
   user authorization code;
   whether use request is cellular.

6. A method as in claim 1, wherein the data in said rules data base includes incoming calls made:
   During business hours;
   During non-business hours;
   Excessively long;
   Domestic accesses;
   To a limited dialed NPA=800;
   To a termination number=CPE;
   To a country code;
   ANI=CPE (Automatic Number Identification with Customer Premises Equipment);
   Accesses using SDN-NRA (Software Defined Network—Network Remote Access);
   To a suspected country code;
   Using a bad ANI;
   Of short duration;
   Using repeated ANI;
   From non-frequent caller;
   To successive different dialed numbers;
   Using suspected patterned dialing;
   With a connect time difference using a less than PDD (Post Dialing Delay)+e, i.e. going from one to another number quickly;
   Using an invalid authorization code;
   With a number of accesses in repeat set greater than threshold;
   Using a SDN Software defined network (virtual private network);
   Using different ANI to same termination No.;
   Using the same authorization code from another location greater than at least one incoming call continuing;
   Having greater than access duration overlap;
   With simultaneous use of mobile number;
   Cellular;
   Of the same MIN;
   Using distance between access locations/elapsed time greater than a given value $\tau$;
   Multiple from same ANI (Automatic Number Identification) greater than x;
   Repeated dialed numbers;
   Terminating at a number which is a known DISA/RMATS (Direct Inward Switched Access/Remote Maintained Access Test System Maintained Port);
   Originating in suspect MPA-NXX or pay phone;
   Multiple incoming calls from same ANI;
   CPE (Customer Premise Equipment) to a Known high fraud country;
   CPE (Customer Premise Equipment) to known medium fraud country;
   Non CPE type of service;
   Suspicious terminating number;
   Multiple incoming calls billed to same number;
   Multiple 800 incoming calls exceeding preset number.

7. A method as in claim 1, wherein the data in said rules data base includes access demands made:
   During business hours;
   During non-business hours;
   Excessively long;
   Domestic incoming calls;
   To a limited dialed MPA=800;
   To a termination number=CPE;
   To a country code;
   ANI=CPE (Automatic Number Identification with Customer Premises Equipment);
   Accesses using SDN-NRA (Software Defined Network—Network Remote Access);
   To a suspected country code;
   Using a bad ANI;
   Of short duration;
   Using repeated ANI;
   From non-frequent accesser;
   To successive different dialed numbers;
   Using suspected patterned dialing;
   With a connect time difference using a less than PDD (Post Dialing Delay)+e, i.e. going from one to another number quickly;
   Using an invalid authorization code;
   With a number of accesses in repeat set greater than threshold;

Using a SDN Software defined network (virtual private network);

Using different ANI to same termination No.;

Using the same authorization code from another location greater than at least one access continuing;

Having greater than access duration overlap;

With simultaneous use of mobile number;

Cellular;

Of the same MIN;

Using distance between access locations/elapsed time greater than a given value $\tau$;

Multiple accesses from same ANI (Automatic Number Identification) greater than x;

Repeated dialed numbers;

Terminating at a number which is a known DISA/RMATS (Direct Inward Switched Access/Remote Maintained Access Test System Maintained Port);

Originating in suspect MPA-NXX or pay phone;

Multiple accesses from same ANI;

CPE (Customer Premise Equipment) to a Known high fraud country;

CPE (Customer Premise Equipment) to known medium fraud country;

Non CPE type of service;

Suspicious terminating number;

Multiple accesses billed to same number;

Multiple 800 accesses exceeding preset number.

8. A system controlling access of a user to a telephone network, comprising:

a control data base with a set of attributes concerning an ongoing incoming call from an access demand source;

a rules data base with a plurality of rules designating one of a plurality of degrees of likelihood that any call having a particular attribute is fraudulent, some of said degrees being high and some being lower;

means for determining whether an attribute in the data in the control data base matches an attribute in the plurality of rules in the rules data base; and means for effecting corrective action in response to a match between data in the control data base and predetermined rules in the rules data base on the basis of the degree of likelihood indicated in the rules database that the call is fraudulent;

the control data base including a first access data base with a first set of attributes concerning the ongoing incoming call;

the control data base including a second access data base with a second set of attributes concerning the history of prior accesses made by the access demand source;

the means for determining whether data in the one of the access data bases matches the rules in the rules data base including means for determining whether to disconnect the incoming call, block future incoming calls, or take other action; and the means for effecting corrective action including means for disconnecting the incoming call, blocking future incoming calls, or taking other action;

the control data base including means for updating the second access data base with data from accesses having matches in the means for determining.

9. A system as in claim 8, wherein the means for effecting corrective action includes ignoring matches of attributes in the control data base and the rules data base when the attribute in the rules data base indicates a lower degree of likelihood that the call may be fraudulent.

10. A system as in claim 9, wherein said first access data base includes data on one or more of the following attributes:

requesting user;

request time;

length of use;

destination requested;

user authorization code;

whether use request is cellular.

11. A system as in claim 8, wherein said second access data base includes data on one of the following:

PBX ANIs (Private Branch Exchange Automatic Number Identifications);

University PBX's and Centrex's;

Suspicious NPAs-NXX (pay phones indicated by ii digits) for originating numbers;

Suspicious Terminating Numbers;

Known bad ANIs;

Suspicious Country codes;

Forbidden country codes;

Compromised Authorization Codes;

ANI's from detected fraud events;

Originating numbers from detected fraud events;

Terminating numbers from detected fraud events;

Authorization codes from detected fraud events;

Other files as required by CSAM (Telephone Corporation Security Administration Monitor).

12. A system as in claim 11, wherein said storage in said first access data base includes storage for one or more of the following attributes:

requesting user;

request time;

length of use;

destination requested;

user authorization code;

whether use request is cellular.

13. A system as in claim 12, wherein the data in said rules data base includes data concerning one of the following types of accesses:

During business hours;

During non-business hours;

Excessively long;

Domestic accesses;

To a limited dialed MPA=800;

To a termination number=CPE;

To a country code;

ANI=CPE (Automatic Number Identification with Customer Premises Equipment);

Accesses using SDN-NRA (Software Defined Network—Network Remote Access);

To a suspected country code;

Using a bad ANI;

Of short duration;

Using repeated ANI;

From non-frequent accesser;

To successive different dialed numbers;

Using suspected patterned dialing;
With a connect time difference using a less than PDD (Post Dialing Delay)+e, i.e. going from one to another number quickly;
Using an invalid authorization code;
With a number of accesses in repeat set greater than threshold;
Using a SDN Software defined network (virtual private network);
Using different ANI to same termination No.;
    Using the same authorization code from another location greater than at
    least one access continuing;
Having greater than access duration overlap;
With simultaneous use of mobile number;
Cellular;
Of the same MIN;
Using distance between access locations/elapsed time greater than a given value $\tau$;
Multiple accesses from same ANI (Automatic Number Identification) greater than x;
Repeated dialed numbers;
Terminating at a number which is a known DISA/RMATS (Direct Inward Switched Access/Remote Maintained Access Test System Maintained Port);
Originating in suspect MPA-NXX or pay phone;
Multiple accesses from same ANI;
CPE (Customer Premise Equipment) to a known high fraud country;
CPE (Customer Premise Equipment) to known medium fraud country;
Non CPE type of service;
Suspicious terminating number;
Multiple accesses billed to same number;
Multiple 800 accesses exceeding preset number.

14. A system as in claim 8, wherein rules data base includes storage of access demands made:
During business hours;
During non-business hours;
Excessively long;
Domestic accesses;
To a limited dialed MPA=800;
To a termination number=CPE;
To a country code;
ANI=CPE (Automatic Number Identification with Customer Premises Equipment);
Accesses using SDN-NRA (Software Defined Network—Network Remote Access);
To a suspected country code;
Using a bad ANI;
Of short duration;
Using repeated ANI;
From non-frequent accesser;
To successive different dialed numbers;
    Using suspected patterned dialing;
With a connect time difference using a less than PDD (Post Dialing Delay)+e, i.e. going from one to another number quickly;
Using an invalid authorization code;
With a number of accesses in repeat set greater than threshold;
Using a SDN Software defined network (virtual private network);
Using different ANI to same termination No;
Using the same authorization code from another location greater than at least one access continuing;
Having greater than access duration overlap;
With simultaneous use of mobile number;
Cellular;
Of the same MIN;
Using distance between access locations/elapsed time greater than a given value $\tau$;
Multiple accesses from same ANI (Automatic Number Identification) greater than x;
Repeated dialed numbers;
Terminating at a number which is a known DISA/RMATS (Direct Inward Switched Access/Remote Maintained Access Test System Maintained Port);
Originating in suspect MPA-NXX or pay phone;
Multiple accesses from same ANI;
CPE (Customer Premise Equipment) to a Known high fraud country;
CPE (Customer Premise Equipment) to known medium fraud country;
Non CPE type of service;
Suspicious terminating number;
Multiple accesses billed to same number;
Multiple 800 accesses exceeding preset number.

* * * * *